United States Patent [19]

Matsuda

[11] Patent Number: 5,506,749
[45] Date of Patent: Apr. 9, 1996

[54] PORTABLE DATA-PROCESSING SYSTEM HAVING A REMOVABLE BATTERY PACK REPLACEABLE WITH A SECOND LARGER BATTERY PACK HAVING A CYLINDRICAL MEMBER USABLE AS A HAND GRIP

[75] Inventor: Kazuyuki Matsuda, Tokyo, Japan

[73] Assignee: Kabushiki Kaisha Toshiba, Kawasaki, Japan

[21] Appl. No.: 272,152

[22] Filed: Jul. 8, 1994

[30] Foreign Application Priority Data

Jul. 26, 1993 [JP] Japan .................................. 5-183877

[51] Int. Cl.⁶ ............................ G06F 1/16; H05K 7/10; H01M 2/10
[52] U.S. Cl. ........................ 361/683; 361/726; 429/99; 429/123
[58] Field of Search .......................... 429/96–100, 123; 320/2; 364/708.1; 312/223.2; 361/680–686, 725–727; 439/928, 928.1

[56] References Cited

U.S. PATENT DOCUMENTS

| | | | |
|---|---|---|---|
| 4,881,839 | 11/1989 | Grimm | 400/692 |
| 4,926,365 | 5/1990 | Hsieh | 364/708.1 |
| 4,991,058 | 2/1991 | Watkins et al. | 361/683 |
| 5,107,401 | 4/1992 | Youn | 361/683 |
| 5,182,699 | 1/1993 | Kobayashi et al. | 361/683 |
| 5,200,883 | 4/1993 | Kobayashi | 361/683 |
| 5,210,681 | 5/1993 | Hosoi et al. | 361/684 |

OTHER PUBLICATIONS

U.S. Patent Application No. 08/080,917, filed Jun. 22, 1993.

*Primary Examiner*—Michael W. Phillips
*Attorney, Agent, or Firm*—Limbach & Limbach

[57] ABSTRACT

A portable data-processing system includes a box-shaped housing having a side and a receptacle opening at the side, a first pack-shaped component removably fitted in the receptacle, and a second pack-shaped component which can be removably fitted in the receptacle in place of the first pack-shaped component. The pack-shaped component has a first part and a second part. The first part is to be removably fitted in the receptacle. The second part is a hollow cylindrical member and is to extend outside the housing and along the side of the housing.

The pack-shaped components may be battery packs with the second pack-shaped component having a greater ampacity than the first pack-shaped component. The housing includes a pen receptacle for storing a stylus pen. The second pack-shaped component includes an engagement member which engages the pen receptacle and a pen-holding section for storing the stylus pen.

21 Claims, 11 Drawing Sheets

PORTABLE DATA-PROCESSING SYSTEM HAVING A REMOVABLE BATTERY PACK REPLACEABLE WITH A SECOND LARGER BATTERY PACK HAVING A CYLINDRICAL MEMBER USABLE AS A HAND GRIP

BACKGROUND OF THE INVENTION

1. Field of the Invention

The present invention relates to a portable data-processing apparatus, such as a portable computer and a portable word processor, into which data can be input by using a pen. More particularly the invention relates to a battery pack for use as a power supply in the portable data-processing apparatus.

2. Description of the Related Art

Recently there have been developed portable computers which has a pressure-sensitive tablet designed for use in place of a keyboard and into which data is input by touching the tablet with a pen. A computer of this type comprises a flat box-shaped housing and a pressure-sensitive tablet. The housing has a flat upper surface, at which the input screen of the tablet is exposed. The computer has a battery pack used as a power supply for driving other components of the computer, and can therefore be used in any place where a commercial power supply is not available. The battery pack is removably placed in the battery receptacle formed in the bottom of the computer housing, while placed in the housing, the battery pack has its bottom and sides located flush with the bottom and sides of the housing and, hence, appears as if it were a part of the computer housing.

The housing of the portable computer described above is so compact that the computer is easy to carry with. The battery pack is also made small, occupying but a smallest space possible in the computer housing. It is smaller than those designed for use in book-sized computers having a keyboard.

The smaller the battery pack, the smaller the power-storage capacity thereof, and the shorter the time for which the portable computer can be used continuously. To use the computer for a relatively long time in a place where no commercial power supply is available, a user must set two or more battery packs in the computer housing. However, the computer housing of a limited size cannot have a space large enough to accommodate two or more battery packs. There has been a demand for a battery pack which is compact enough to be used in a pen-input type portable computer and which has a power-storage capacity great enough to drive the computer for a long time.

SUMMARY OF THE INVENTION

In view of the foregoing, it is an object of the invention to provide a handy, portable data-processing apparatus to which an additional pack-like component such as a battery pack can be removably incorporated with ease, without enlarging the housing of the apparatus, and in which the additional pack-like component can be used as a grip to help a user to easily hold the apparatus in the hand.

Another object of the present invention is to provide a portable data-processing apparatus to which a pack-like component can be removably connected and can be steadfastly held by using some of the indispensable components of the apparatus.

Still another object of the present invention is to provide a portable data-processing apparatus in which a battery pack having a large power-storage capacity can be removably incorporated, without enlarging the housing of the apparatus, so that the apparatus may be continuously used for a long time.

Another object of the invention is to provide a portable data-processing apparatus to which a data-inputting pen can be connected even while an additional battery pack is connected to the apparatus, so that the apparatus may be more user-friendly than otherwise.

To attain the objects mentioned above, there are provided various portable data-processing apparatuses according to the present invention.

In a first aspect of the invention there is provided a portable data-processing apparatus which comprises: a box-shaped housing having a side and a receptacle opening at the side; a first pack-shaped component removably fitted in the receptacle; a second pack-shaped component capable of being removably fitted in the receptacle in place of the first pack-shaped component. The second pack-shaped component has a first part which is to be removably fitted in the receptacle and a second part which is a hollow cylindrical member and which is to extend outside the housing and along the side of the housing.

When the first pack-shaped component is removed from the receptacle and the second pack-shaped component is fitted into the receptacle, the second part of the second pack-shaped component is positioned, extending along the side of the housing, not conspicuously protruding from the side of the housing. Hence, the computer remains relatively compact. Extending along the side of the housing, the second part, i.e., a hollow cylindrical member, can be used as a grip, helping a user to easily hold the apparatus in the hand.

In a second aspect of this invention there is provided a portable data-processing apparatus which comprises: a box-shaped housing having a side, a first receptacle opening at an end of the side and a second receptacle located at the opposite end of the side; a first pack-shaped component removably fitted in the first receptacle; and a second pack-shaped component capable of being removably fitted in the first receptacle in place of the first pack-shaped component. The second pack-shaped component has a first part which is to be removably fitted in the first receptacle and a second part which is a hollow cylindrical member connected to the first part and which is to be located outside the housing. The second part has an engagement member which can be removably fitted in the second receptacle of the housing.

In this apparatus, the second pack-shaped component is attached to the housing by fitting the first part in the first receptacle and simultaneously fitting the second part in the second receptacle. Not only the first part, but also the second part is supported by the housing. Hence, the second pack-shaped component can be firmly secured to the housing.

Since the second part, i.e., a hollow cylindrical member, is located outside the housing, it can be used as a grip. Further, since the second pack-shaped component is attached to the housing at two parts, i.e., the first part and the engagement member, the second pack-shaped component will not move relative to the housing, or no force will concentrate at the interface between the first receptacle and the first part, when the second part is held in the hand.

Both the first receptacle and the second receptacle are indispensable to the portable data-processing apparatus. The housing needs to have no additional component to attach the second pack-shaped component to the housing.

In a third aspect of the present invention there is provided a portable data-processing apparatus which comprises: a box-shaped housing having an upper surface and a bottom surface which oppose each other and four side surfaces continuous to the upper surface and the bottom surface, the housing having a battery receptacle opening in a corner defined by the bottom surface and two opposing ones of the side surfaces, and having a pen receptacle located at an end opposite to the battery receptacle; a data input section mounted on the upper surface of the housing, for inputting data; a pen removably held in the pen receptacle, for inputting data into the data input section; a first battery pack removably fitted in the battery receptacle and functioning as a power supply for driving components contained in the housing; and a second battery pack capable of being removably fitted in the first receptacle in place of the first battery pack and having a greater power-storage capacity than the first battery pack. The second battery pack has a first part which is to be removably fitted in the battery receptacle and a second part which is a hollow cylindrical member connected to the first part and which is to be located outside the housing. The second part has an engagement member which faces away from the first part and which can be removably fitted in the pen receptacle.

To use this apparatus for a relatively long time in a place without commercial power supply, a user first removes the first battery pack from the housing and pulls the pen from the pen receptacle. Next, he or she fits the second battery pack in the battery receptacle, thus positioning the second part along the side of the housing. Then, the user inserts the engagement member of the second part into the pen receptacle. The second battery pack is thereby attached the housing at two portions, i.e., the first part and the engagement member.

So far as the second battery pack remains attached to the housing, its second part extends along the side of the housing. Hence, no part of the second battery projects from the housing. In addition, the second part, which is a hollow cylindrical member, can be used as a grip.

Since the second battery pack is attached the housing at two portions, the second battery pack will not move relative to the housing, or no force will concentrate at the interface between the first receptacle and the first part, when the second part is held in the hand. Furthermore, since the first receptacle and the second receptacle are both indispensable to the portable data-processing apparatus, the housing needs to have no additional component to attach the second battery pack to the housing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

An embodiment of the present invention, which is a pen-input type portable computer, will be described with reference to the accompanying drawings.

Figure 1:
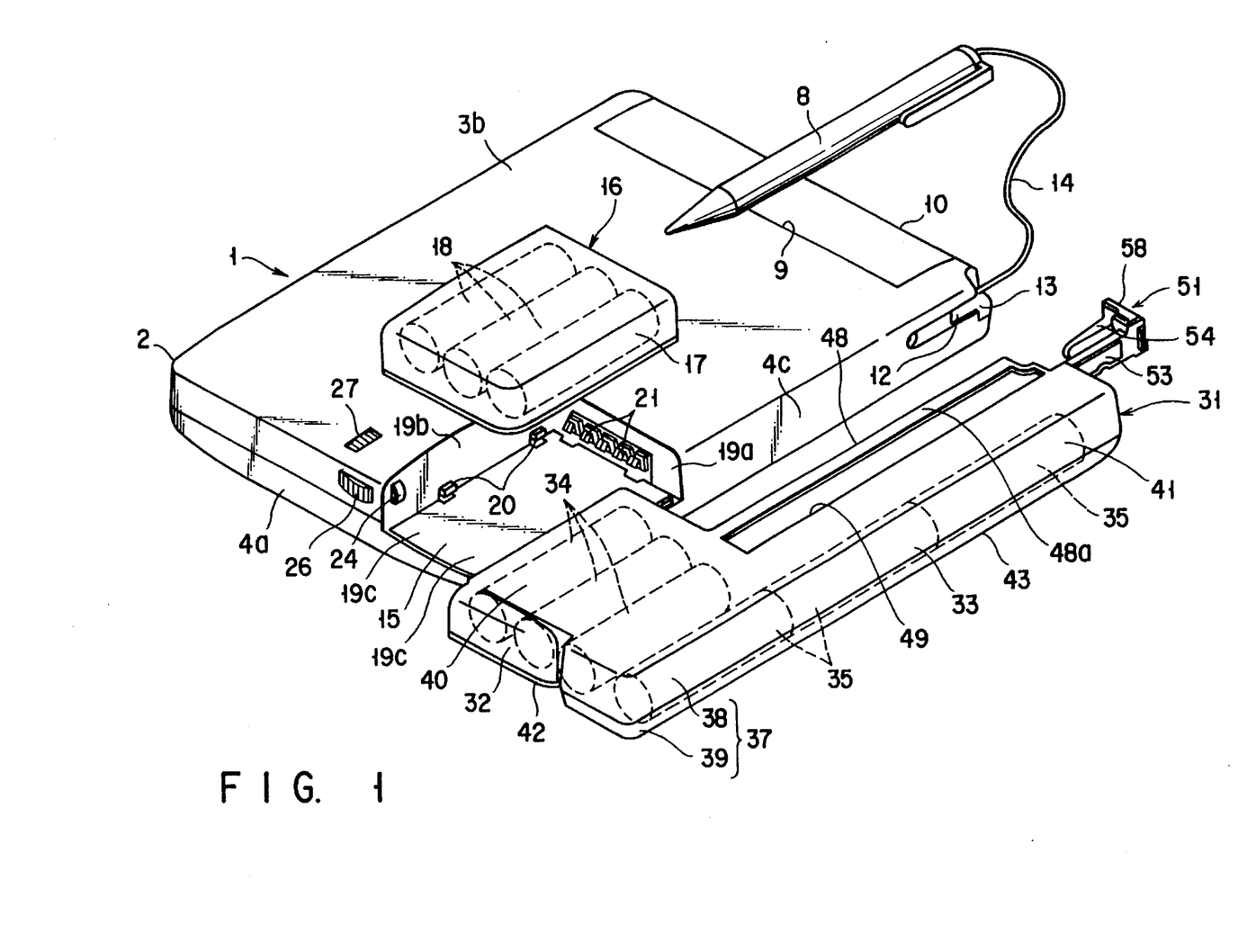
FIG. 1 is a perspective view of a portable computer according to a first embodiment of the invention, illustrating the first and second battery packs, both having been removed from the housing of the computer.
Figure 3:
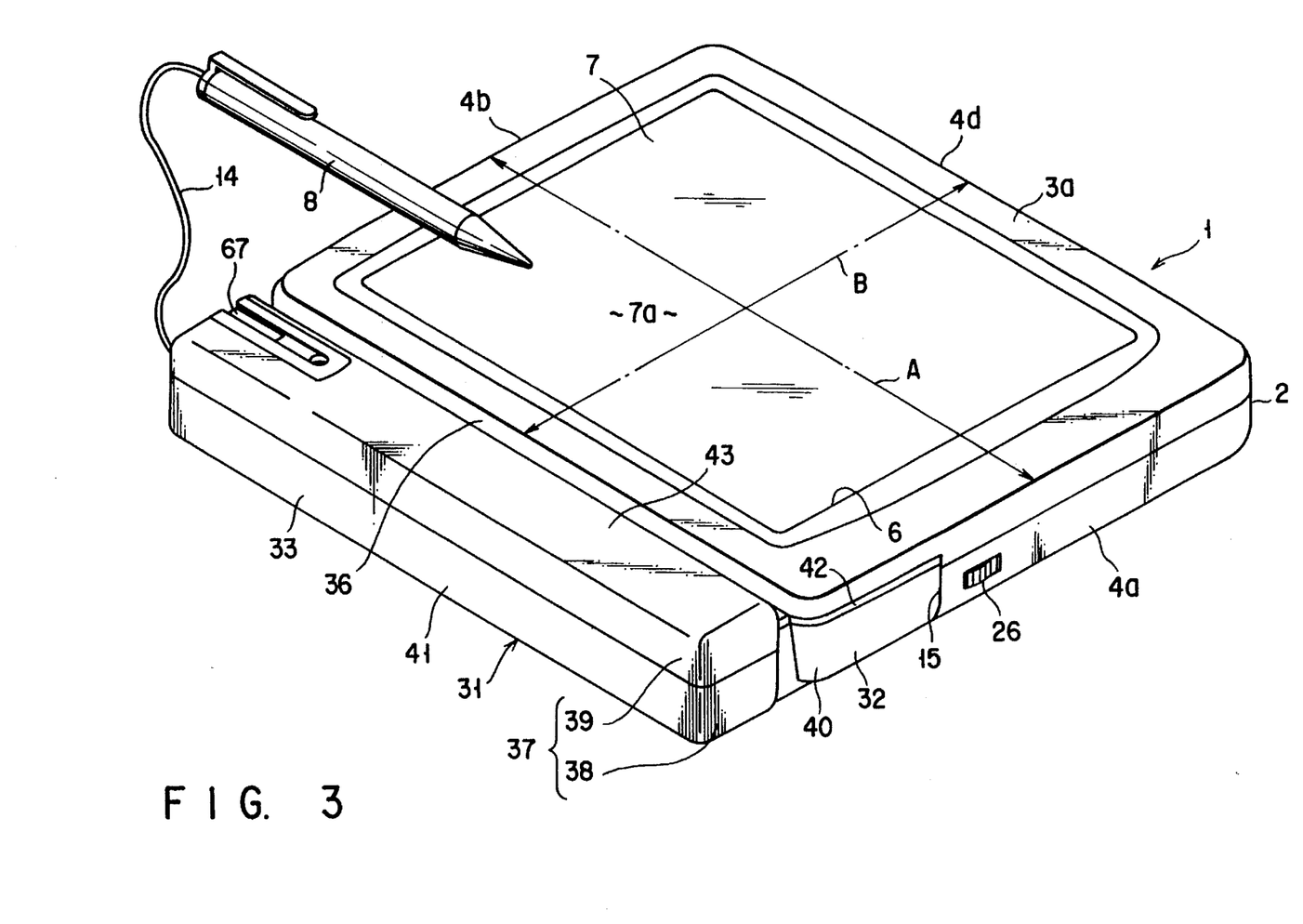
FIG. 3 is a perspective view of the portable computer, showing the second battery pack incorporated in the housing of the computer.

As shown in FIGS. 1 and 3, the portable computer 1 has a housing 2 made of a synthetic resin. The housing 2 is shaped like a flat rectangular box. It has a top 3a, bottom 3b and four sides 4a to 4d. The top 3a and the bottom 3b oppose each other, and the sides 4a to 4d are continuous to the top 3a and the bottom 3b. As best shown in FIG. 3, the top 3a and the bottom 3b are rectangular, each having a length A and a width B. When the computer 1 is located in a portrait position, its first side 4a faces to the user. When the computer 1 is placed in a landscape position, its third side 4c faces the user.

The housing 2 has a rectangular opening 6 in the top 3a. The opening 6 is closed by a transparent protective cover 7. A touch-panel type input device is arranged beneath the protective cover 7. The input device is of the known type; it comprises a pressure-sensitive tablet and a liquid crystal display panel which are laid one upon the other. Since the cover 7 is transparent, any image the panel displays can be seen from above the cover 7. The outer surface of the cover 7 works as data-input panel 7a. Hence, when the user touches the data-input panel 7a with a stylus pen 8, the pressure-sensitive tablet generates signals, whereby data, i.e., the signals, are input to the computer 1.

Figure 7:
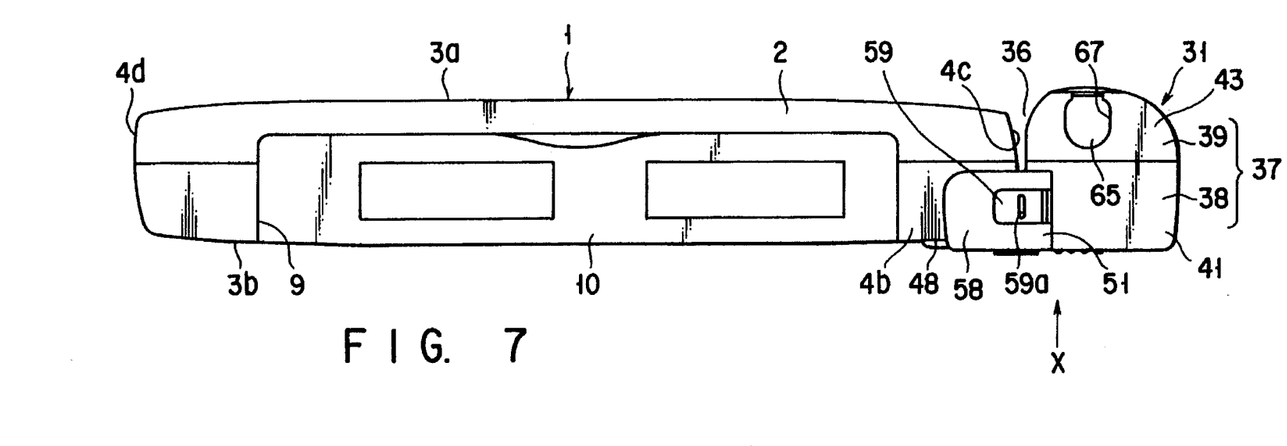
FIG. 7 is a right-side view of the portable computer, with the second battery pack attached to it.
Figure 8:
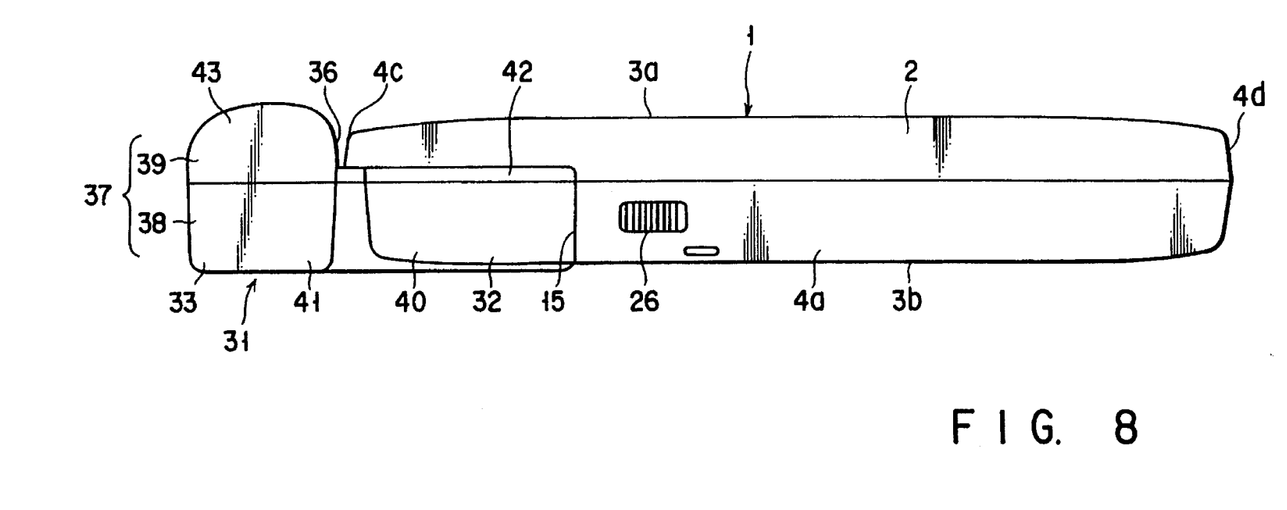
FIG. 8 is a left-side view of the portable computer, with the second battery pack attached to it.

As can be understood from FIGS. 1 and 7, the housing 2 has a card slot 9 partly in the second side 4b and partly in the bottom 3b. Through the card slot 9 a memory card, an interface card or an application card can be inserted into the housing 2. The card slot 9 is covered with a side cover 10 which can be rotated between two positions where it closes and opens the slot 9, respectively.

Figure 2:
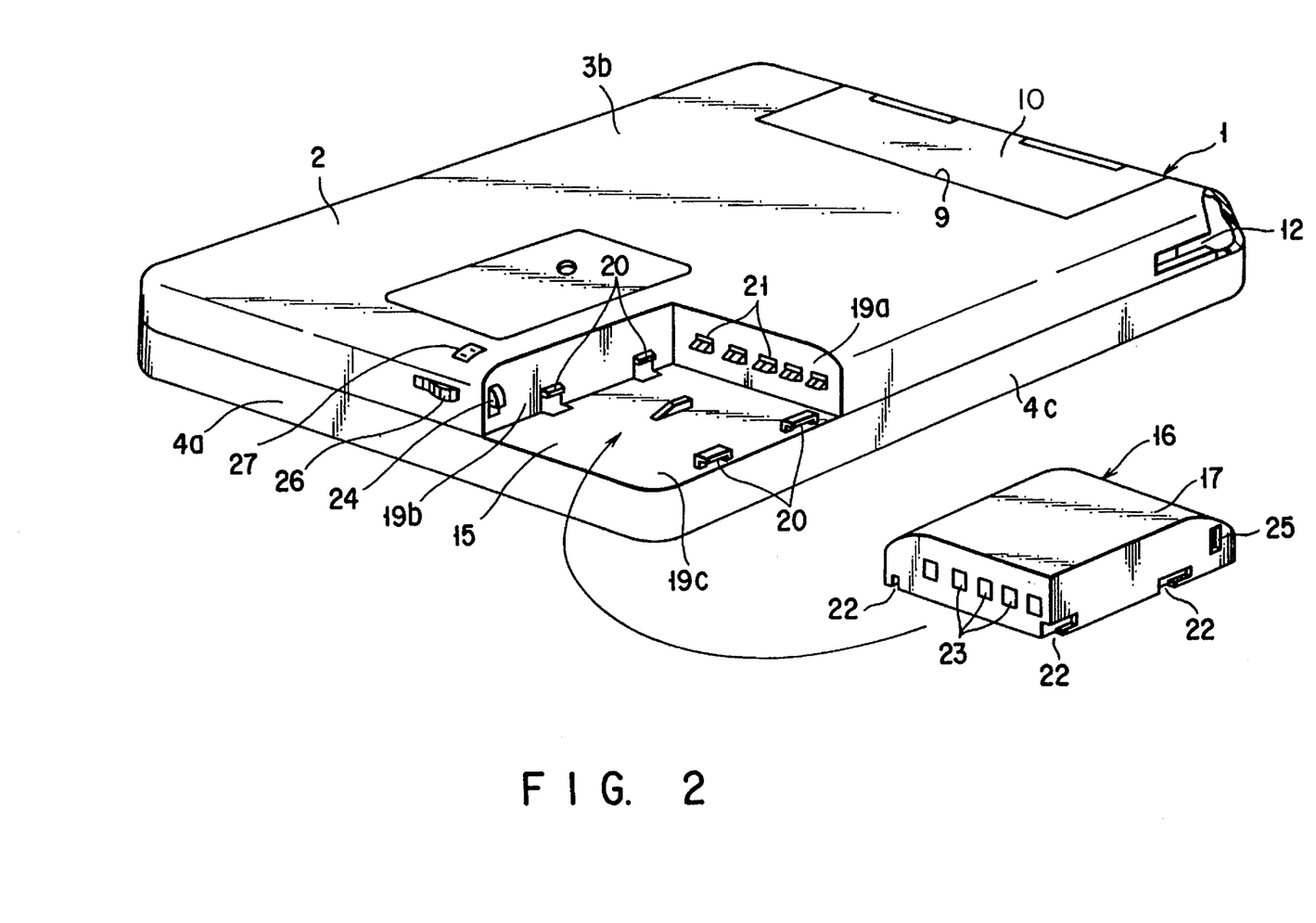
FIG. 2 is a perspective view of the portable computer, showing the first battery pack removed from the housing of the computer.
Figure 14:
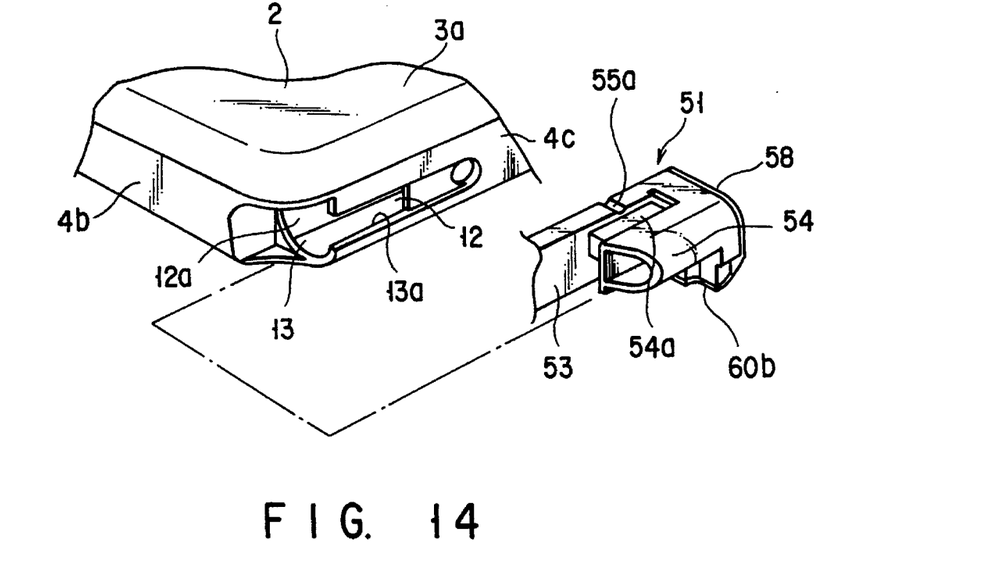
FIG. 14 is a perspective view of part of the portable computer, showing the engagement unit and the pen receptacle formed in the housing.
Figure 15:
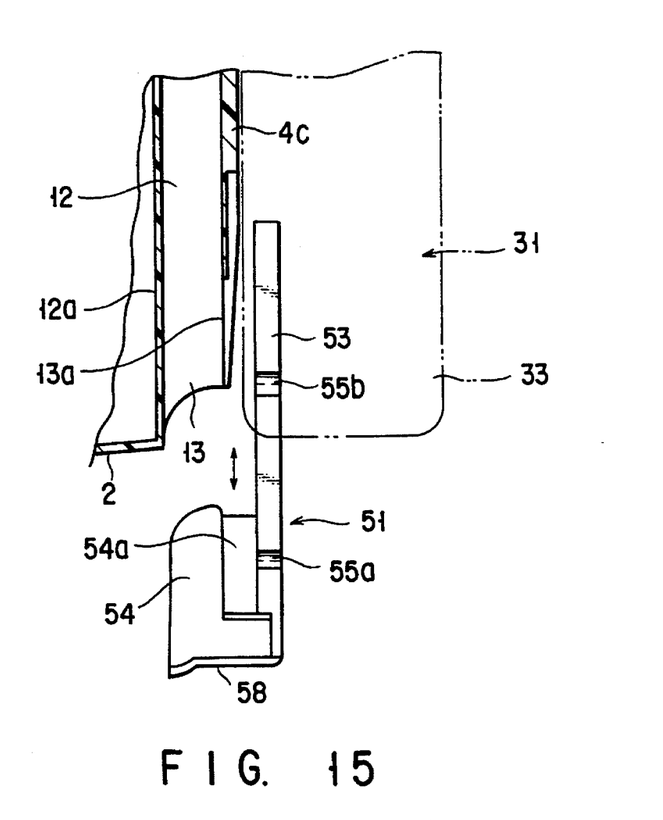
FIG. 15 is a sectional view showing part of the portable computer, without the engagement unit in the pen receptacle.
Figures 16, 17:
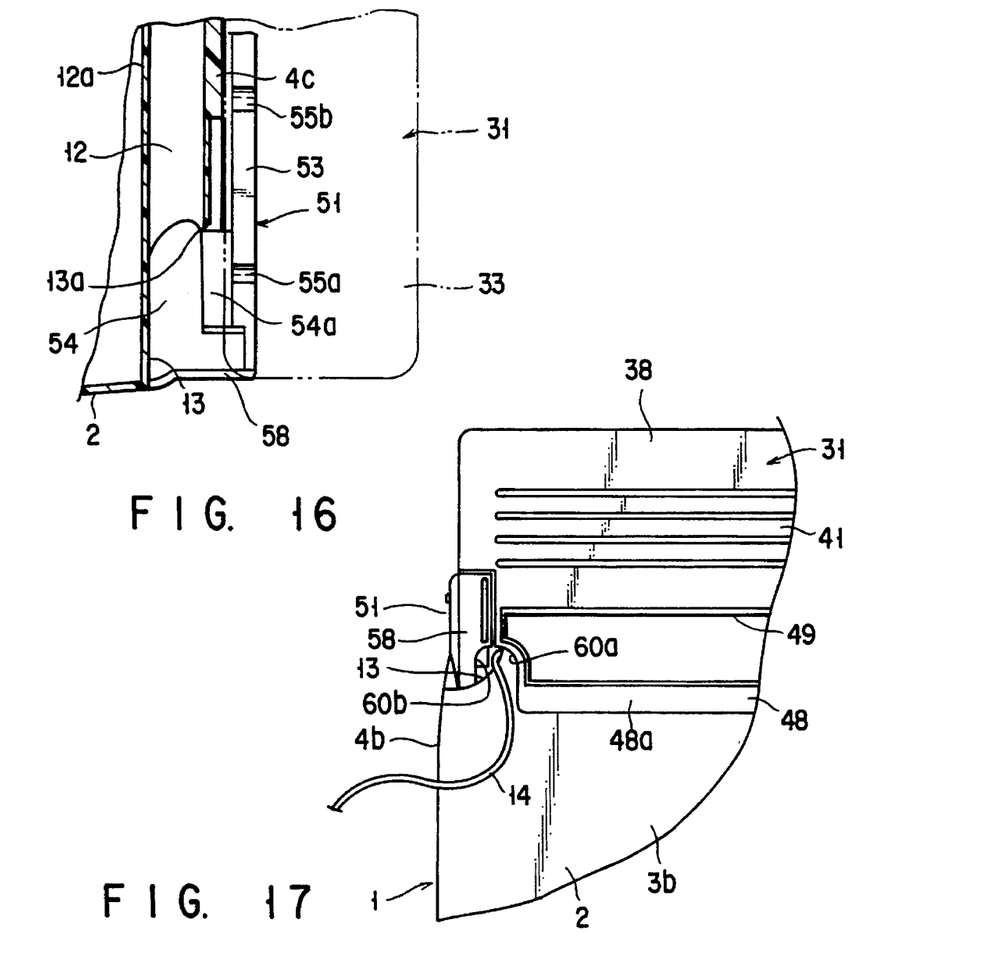
FIG. 16 is a sectional view showing part of the portable computer, with the engagement unit in the pen receptacle.
FIG. 17 is a bottom view of part of the portable computer, view in the direction of arrow X shown in FIG. 7

As shown in FIG. 2, the housing 2 has a pen receptacle 12. As shown in FIGS. 14, 15 and 16, the pen receptacle 12 is comprised of the third side 4c and a partition 12a arranged inside the third side 4c, and extends in the lengthwise direction A of the housing 2. The pen receptacle 12 has an entrance port 13 opening at that corner of the housing 2 which is defined by the second side 4b and the third side 4c. The third side 4c has a slit 13a which exposes the interior of the pen receptacle 12. The stylus pen 8 is tied to the housing 2 by a cord 14, so that it may not be lost. The cord 14 extends into the pen receptacle 12 through the entrance port 13.

As shown in FIGS. 1 and 2, the housing 2 has a recess, or a battery receptacle 15, in the corner defined by the first side 4a and the second side 4b. The battery receptacle 15 therefore is spaced apart from the pen receptacle 12 in the lengthwise direction of the housing 2. The battery receptacle 15 opens at the first side 4a, the second side 4b and the bottom 3b of the housing 2.

Removably fitted in the receptacle 15 is a first battery pack 16 which is a standard component of the portable computer 1. The first battery pack 16 comprises a case 17 and three rechargeable nickel-cadmium batteries 18 contained in the case 17. The case 17 has a size and shape which are virtually identical to those of the battery receptacle 15. Hence, once the case 17 has been fitted in the battery receptacle 15, its three surfaces are flush with the first side 4a, the third side 4c and the bottom 3b of the housing 2, respectively.

As shown in FIG. 2, the battery receptacle 15 has two vertical walls 19a and 19b and one horizontal wall 19c. The vertical walls 19a and 19b extend from the bottom 3b of the housing 2, whereas the horizontal wall 19c is virtually parallel to the bottom 3b. Two engagement projections 20 protrude from the vertical wall 19b, and two engagement projections 20 protrude from the horizontal wall 19c. Power-supply and signal terminals 21 are arranged on the vertical wall 19a. A lock member 24 is biased by a spring (not shown) provided within the housing 2 and projects from the horizontal wall 19b. The lock member 24 can be pushed into the housing 2 against the force of the spring.

The first battery pack 16 has engagement recesses 22, contacts 23 and a recess 25. The recesses 22, the contacts 23, and the recess 25 are so positioned that the projections 20 will be fitted into the recesses 22, the terminals 21 will contact the contacts 23, and the lock member 24 will be fitted into the recess 25, when the pack 16 is fitted in the battery receptacle 15. As long as the lock member 24 remains in engagement with the recess 25, the first battery pack 16 is firmly held in the battery receptacle 15.

The lock member 24 is coupled to a release lever 26 which protrudes from the first side 4a of the housing 2. The release lever 26 can slide between a lock position and a release position. When moved to the release position, the lever 26 pulls the lock member 24 into the housing 2. The lock member 24 is thereby released from the recess 25 made in one side of the first battery pack 16. Then, the first battery pack 16 can be removed from the battery receptacle 15.

A lock lever 27 is located at the bottom 3b of the housing 2. While set in a predetermined position, the lever 27 holds the release lever 26 at the lock position, thus preventing undesirable removal of the first battery pack 16 from the battery receptacle 15.

As shown in FIG. 1, a second battery pack 31 may be attached to the housing 2, in place of the first battery pack 16. The second battery pack 31 is an optional component of the portable computer 1. It has a greater power-storage capacity than the first battery pack 16. The second battery pack 31 will be described in detail.

The second battery pack 31 comprises a first pack section 32 and a second pack section 33. The first pack section 32 can be fitted in the battery receptacle 15. The second pack section 33 is made integral with the first pack section 32.

The first pack section 32 has the same size and shape as the first battery pack 16. It contains three rechargeable nickel-cadmium batteries 34. Like the first battery pack 16, the first pack section 32 has engagement recesses 22, contacts 23 and a recess 25. When the section 32 is set in the battery receptacle 15, the projections 20 are fitted into the recesses 22, the terminals 21 contact the contacts 23, and the lock member 24 are fitted into the recess 25. The first pack section 32 then remains held steadfastly in the battery receptacle 15.

The second pack section 33 is generally a hollow cylinder. The second pack section 33 contains three rechargeable nickel-cadmium batteries 35 which are arranged coaxial. The first pack section 32 is formed integral with one end portion of the second pack section 33. As long as the first pack section 32 remains fitted in the battery receptacle 15, the second pack section 33 extends along the third side 4c of the housing 2, from one end thereof to the other end thereof. Since the third side 4c is a longer side of the housing 2, the section 33 has substantially the same length as the housing 2.

Figure 9:
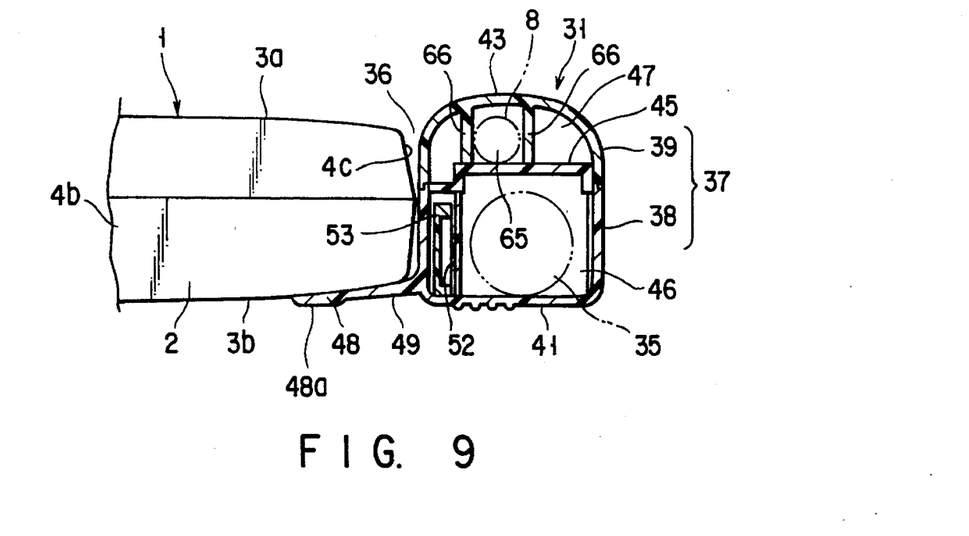
FIG. 9 is a cross-sectional view of the second battery pack.

The pack sections 32 and 33 are formed of a case 37 which is made of a synthetic resin. As best shown in FIG. 9, the case 37 comprises a lower half 38 and an upper half 39. The lower half 38 has an open top, and the upper half 39 is mounted on the lower half 38.

The lower half 38 of the case 37 consists of a first battery-containing portion 40 and a second battery-containing portion 41. The first battery-containing portion 40 constitutes the bottom and side of the first pack section 32, whereas the second battery-containing portion 41 constitutes the lower half of the second pack section 33.

The upper half 39 of the case 37 consists of a two top plates 42 and 43. The first top plate 42 constitutes the top of the first pack section 32, and the second top plate 43 constitutes the upper half of the second pack section 33. As shown in FIG. 9, the second top plate 43 is curved, having an arcuate cross section. Therefore, a recess 36 opening upwards and serving as a finger rest is formed between the second top plate 43 and the third side 3c of the housing 2 as long as the second battery pack 31 remains attached to the housing 2.

As shown in FIG. 9, the lower and upper halves 38 and 39 of the case 37 abut each other and are fused together. An intermediate frame 45 is located in the case 37, extending horizontally at a level where the lower half 38 and the upper half 39 abut on each other. The frame 45 is an elongated plate and positioned between the second battery-containing portion 41 and the second top plate 43. A lower receptacle 46 is defined between the intermediate frame 45 and the second battery-containing portion 41, and an upper receptacle 47 is defined between the intermediate frame 45 and the second top plate 43. In other words, the frame 45 partitions the interior of the second pack section 33 of the case 37 into the lower receptacle 46 and the upper receptacle 47. The lower receptacle 46 contains the nickel-cadmium batteries 35. The upper receptacle 47 contains the stylus pen 8.

Figure 4:
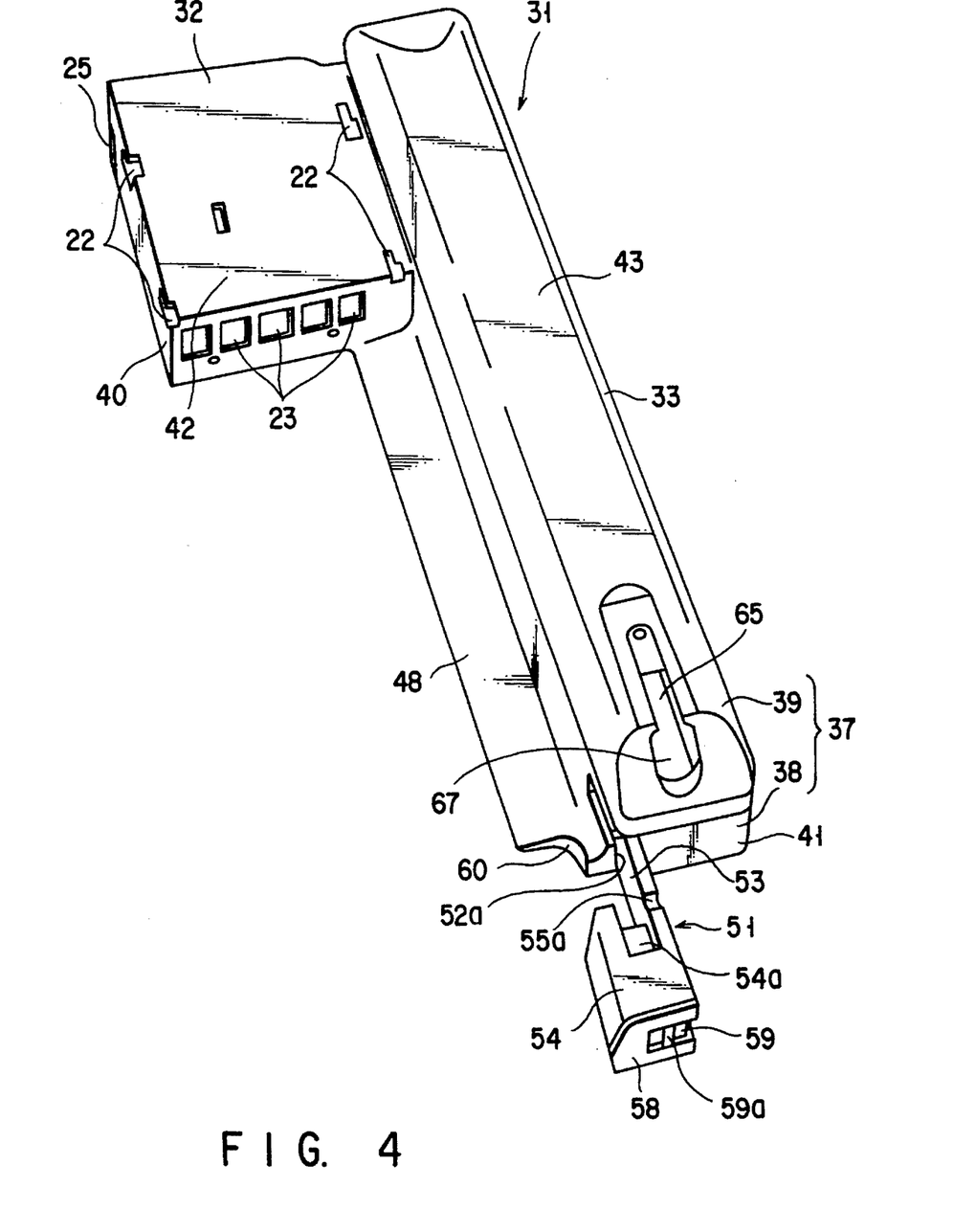
FIG. 4 is a perspective view of the second battery pack.

As illustrated in FIGS. 4 and 9, a support wall 48 is formed integral with the second battery-containing portion 41 and is, hence, connected to the first battery-containing portion 40. The wall 48 overlaps the bottom 2b of the housing 2 when the second battery pack 31 is fitted in the battery receptacle 15. The support wall 48 has a recess 49 in its lower surface 48a. This recess 49, which is used as a finger rest, extends in the lengthwise direction of the second battery-containing portion 41.

As shown in FIGS. 1 and 4, the second pack section 33 has an engagement member 51 at the end distant from the first pack section 32. The member 51 can be pulled from and pushed into the pen receptacle 12 formed in the housing 2. As shown in FIGS. 9 to 13, the engagement member 51 is slidably supported in the lower half 38 of the case 37. A guide groove 52 is made in the inner vertical surface of the lower half 38 and extends in the lengthwise direction of the lower half 38. That end of the groove 52 which opens at the corner of the lower half 38 is an insertion port 52a. A slit 52b is cut in that side of the lower half 38 which is continuous to the insertion port 52a. The slit 52b is so positioned as to oppose the slit 13a made in the third side 4c of the housing 2, as long as the second battery pack 31 remains fitted in the battery receptacle 15.

The engagement member 51 comprises a plate-shaped slider 53 and a hollow cylindrical projection 54. The slider 53 is slidably fitted in the guide groove 52. The projection 54 is connected to one end of the slider 53. The projection 54 may extend through the entrance port 13 of the pen receptacle 12 and may be eventually fitted into the pen receptacle 12. The engagement member 51 is supported in the case 37 and can move between two prescribed positions. When the engagement member 51 is at the first position, the projection 54 is fitted in the pen receptacle 12. When the member 51 is at the second position, the projection 54 is released from the pen receptacle 12.

The engagement member 51 further comprises a guide wall 54a located between the slider 53 and the projection 54. The guide wall 54a will fit into the slit 13a when the engagement member 51 is moved toward the first position. Once the wall 54a has fitted into the slit 13a, the engagement member 51 is aligned with the entrance port 13 of the pen receptacle 12, whereby the projection 54 is guided into the pen receptacle 12.

Figure 10:
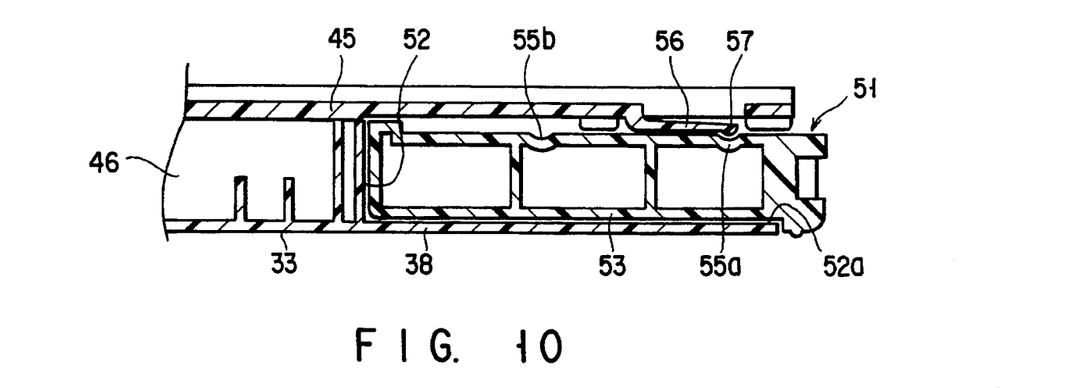
FIG. 10 is also a cross-sectional view of the second battery pack, showing the engagement member already slid to the first position where it fits in the pen receptacle.
Figure 11:
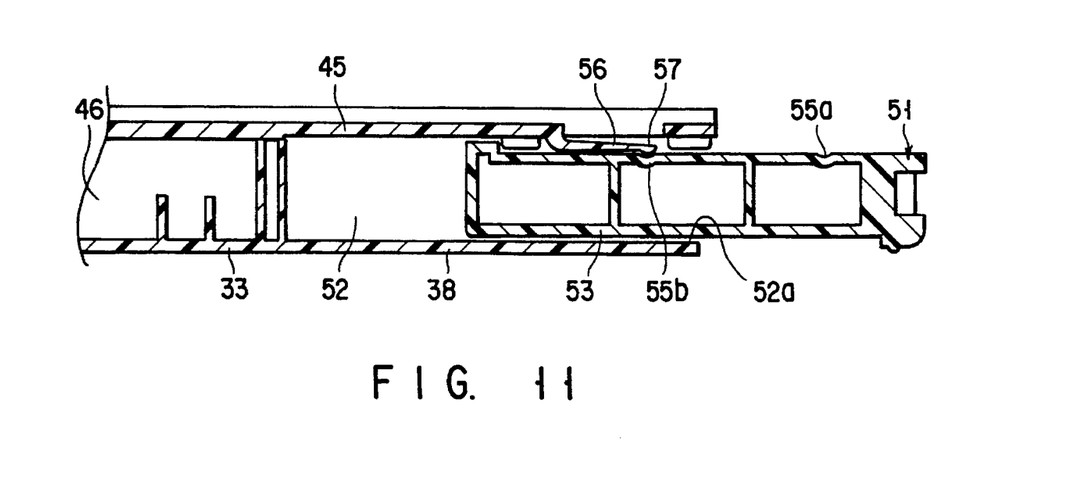
FIG. 11 is another cross-sectional view of the second battery pack, showing the engagement member slid to the second position where it released from the pen receptacle.

As can be understood from FIGS. 10 and 11, the slider 53 has a pair of positioning grooves 55a and 55b in its upper edge. The positioning grooves 55a and 55b are set apart in the sliding direction of the slider 53. The upper edge of the slider 53 opposes the intermediate frame 45. The frame 45 has an engagement member 56 extending parallel to the upper edge of the slider 53. The engagement member 56 has a rounded tip 57 and can resiliently move up and down. The tip 57 bulges downwards so that it may resiliently fit into the positioning groove 55a or 55b when the engagement member 51 is moved along the guide groove 52. When the tip 57 fits into the groove 55a, the member 51 is held in the first position where the projection 54 is fitted in the pen receptacle 12. When the tip 57 fits into the groove 55b, the member 51 is held in the second position where the projection 54 is released from the pen receptacle 12.

As shown in FIGS. 15 and 16, the projection 54 has a cover 58 for covering the entrance port 13 of the pen receptacle 12. The cover 58 will be located substantially flush with the second side 4b of the housing 2 or with the support wall 48 of the lower half 38 of the case 37. A lock lever 59 (see FIGS. 4 and 12) is coupled to the cover 58. The lock lever 59 can be moved between two positions where it protrudes and retreats from the side of the slider 53, respectively. The lever 59 has a knob 59a which is not covered by the cover 58 and which serves as a finger rest.

Figure 12:
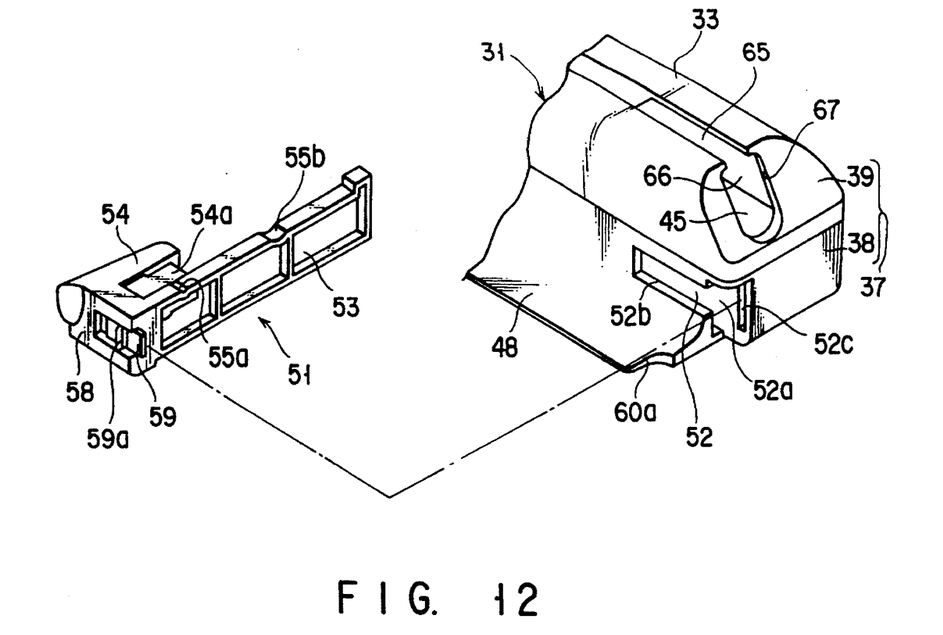
FIG. 12 is an exploded view, illustrating the positional relationship between the second package section of the second battery pack and the lock lever of the engagement unit.

As shown in FIG. 12, the guide groove 52 which guides the slider 53 has an engagement recess 52c formed in the side. The engagement recess 52c opposes the insertion port 52a of the guide groove 52. It comes to oppose the lock lever 59 when the engagement member 51 is slid to the first position where the projection 54 is fitted in the pen receptacle 12. When the lock lever 59 is slid to the first position, the tip of the lever 59 fits into the engagement recess 52c, locking the engagement member 51 at said first position. The second battery pack 31 can therefore be attached to the portable computer 1 by fitting the first pack section 32 in the battery receptacle 15, sliding the engagement member 51 to the first position, thus fitting the projection 54 is fitted into the pen receptacle 12.

Figure 5:
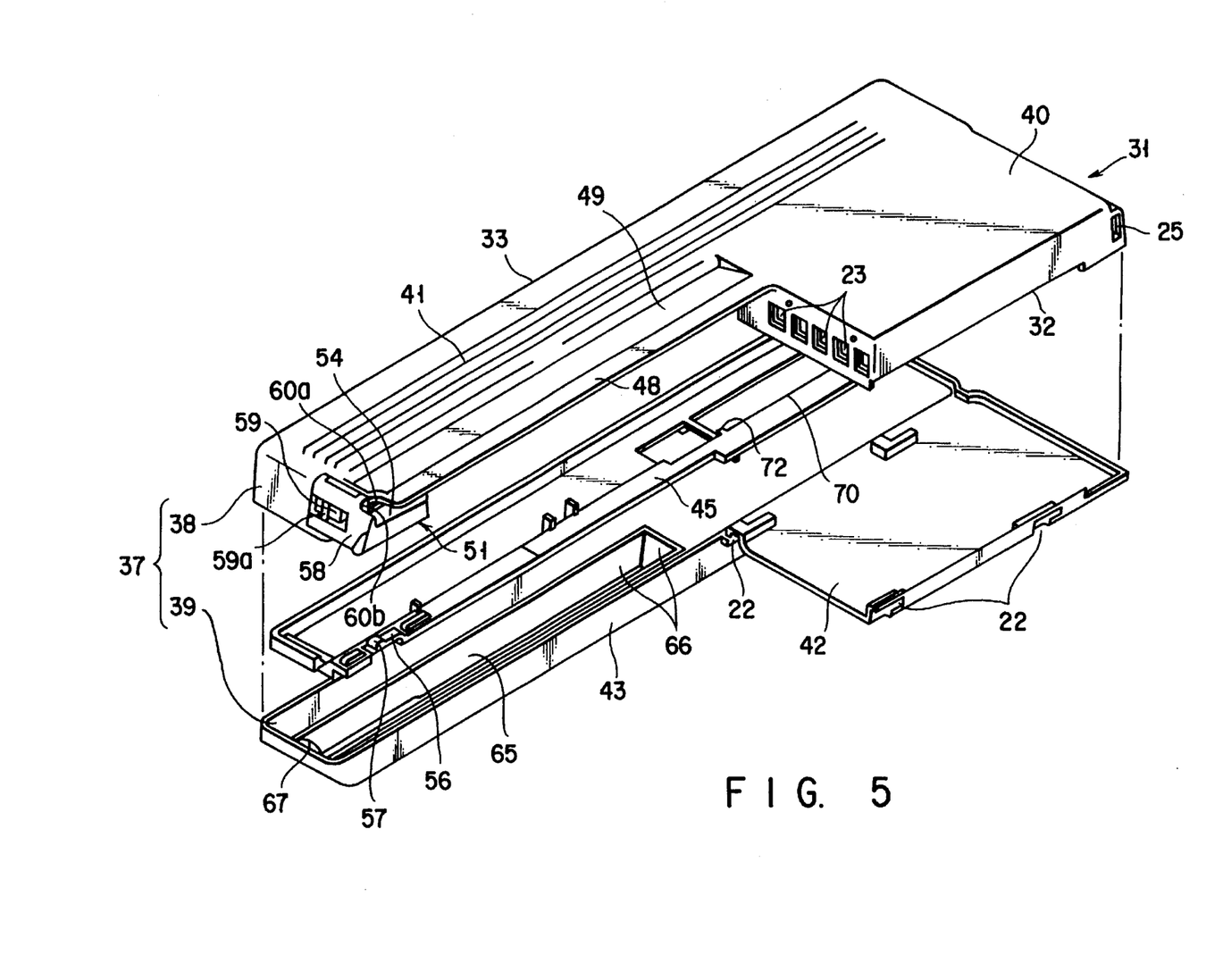
FIG. 5 is a perspective view of the second battery pack, with its case removed.
Figure 13:
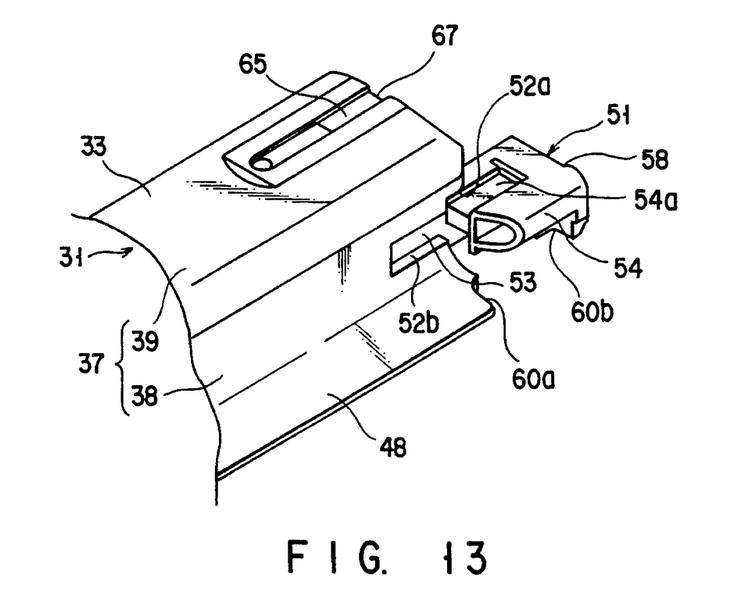
FIG. 13 is a perspective view of the second battery pack, illustrating the engagement member slid to the second position.

As shown in FIGS. 13 and 17, the support wall 48 has a recessed portion 60a, and the cover 58 has a recessed portion 60b which opposes the recessed portion 60a. The recessed portions 60a and 60b are aligned with the entrance port 13 of the pen receptacle 12 as long as the second battery pack 31 is attached to the computer 1. The cord 14, which ties the stylus pen 8 to the housing 2, is led from the pen receptacle 12 through these recessed portions 60a and 60b. Hence, the cord 14 be pulled from the pen receptacle 12 even while the projection 54 of the engagement member 51 fitted into the pen receptacle 12. As shown in FIGS. 5 and 9, a pen-holding section 65 is provided in the upper receptacle 47 of the second pack section 33. In the section 65 the stylus pen 8 can be held removably. The pen-holding section 65 is a space which is defined by the upper surface of the intermediate frame 45 and a partition wall 66 extending from the inner surface of the upper half 39 of the case 37. The section 65 extends in the lengthwise direction of the upper half 39 of the case 37 and is located at the right half of the upper half 39. The section 65 has a pen-insertion port 67 formed at one end of the upper half 39.

Figure 18:
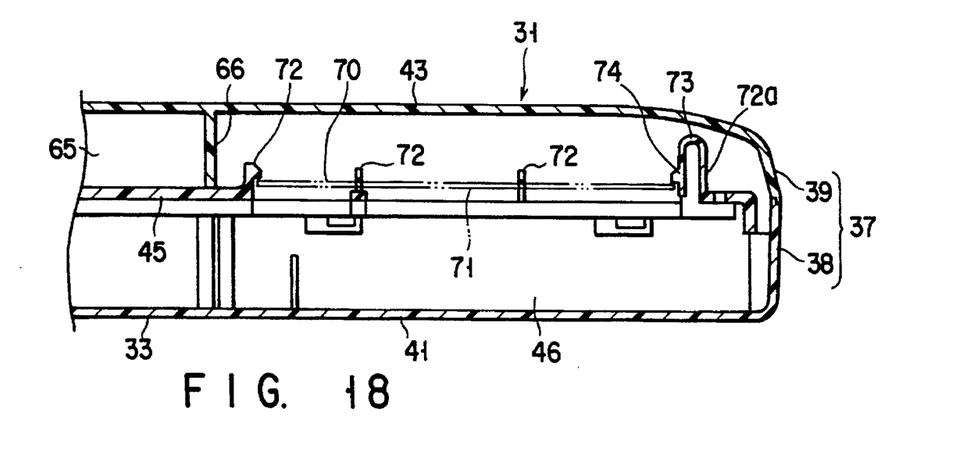
FIG. 18 is a sectional view of the second battery pack.

As shown in FIG. 18, the intermediate frame 45 has a board-supporting section 70 on the upper surface. A plurality of fasteners 72 are formed integral with the frame 45 and arranged on the upper surface of the frame 45. A circuit board 71 is supported by the section 70, with its two long side and one short side fastened by the fasteners 72 to the intermediate frame 45. One of the fasteners 72 which abut on one short side of the circuit board 71, i.e., fastener 72a, is comprised of an arcuate portion 73 and a tongue portion 74. The tongue portion 74 extends downwards from the portion 73 and can resiliently bend. Hence, the elastic fastener 72a, cooperating with the rigid ones 72, can fasten the board 71 to the frame 45 even if the circuit board 71 is somewhat longer than the design length.

How the portable computer 1 is used will be described below.

To use the computer 1 for a relatively long time in any place where no commercial power supply is available, a user removes the first battery pack 16 from the battery receptacle 15 of the housing 2, and fits the second battery pack 31 into the battery receptacle 15. Stated more precisely, the user pulls the stylus pen 8 from the pen receptacle 12 and slides the engagement member 51 to the second position, whereby the projection 54 is released from the pen receptacle 12. Then, in this condition, the user inserts the first pack section 32 into the battery receptacle 15, from the first side 4a of the housing 2. The projections 20 of the housing 2 are thereby fitted into the recesses 22, and the lock member 24 are simultaneously fitted into the recess 25. The first pack section 32 is therefore held steadfastly in the battery receptacle 15. At this time the projection 54 of the engagement member 51 comes to oppose the entrance port 13 of the pen receptacle 12.

Next, the user slides the engagement member 51 to the first position, whereby the projection 54 is fitted into the pen receptacle 12. Once the projection 54 has been fitted in the pen receptacle 12, the second pack section 33 is supported by the housing 2, whereby the the second battery pack 31 is attached to the housing 2 at its both ends which are far spaced in the lengthwise direction of the housing 2. Now that the second battery pack 31 is attached to the housing 2, the second pack section 33 extends along the third side 4c of the housing 2, and the support wall 48 which extends from the lower half 38 of the case 37 overlaps the bottom 3b of the housing 2. Finally, the user slides the lock lever 59 to the first position, fitting the lever 59 fits into the engagement recess 52c. As a result, the engagement member 51 is locked at the first position, maintaining the projection 54 held in the pen receptacle 12.

In order to remove the second battery pack 31 from the housing 2, the user slides the lock lever 59 to the second position, releasing the engagement member 51 from the first position. Then, he or she slides the member 51 to the second position, thereby releasing the projection 54 from the pen receptacle 12, and pulls the projection 54 out of the pen receptacle 12. Next, the user slides the release lever 26 to the release position. In the release position the lever 26 pulls the lock member 24 into the housing 2, releasing the lock member 24 from the recess 25. Then, the user pulls the second battery pack 31 toward the first side 4a of the housing 2, thereby disengaging the projections 20 from the recesses 22. Thus, the second battery pack 31 is removed from the housing 2.

As described above, when the second battery pack 31 is attached to the housing 2, the first pack section 32 is fitted into the battery receptacle 15 and the second pack section 33 is arranged along the third side 4c of the housing 2. The second battery pack 31 has no parts conspicuously bulging from the housing 2. The second battery pack 31 does not impair the compactness of the computer housing 2. Furthermore, the second battery pack 31 can lengthen the time for which the portable computer 1 can be used in a place where no commercial power supply is available. Therefore, the user need not carry many spare battery packs, along with the computer 1, in order to use the computer 1 in a place without a commercial power supply.

Since the second pack section 33 is a hollow cylinder and extends along the third side 4c of the housing 2 as long as the second battery pack 31 is attached to the housing 2, it can be used as a grip. This renders the computer 1 easy to hold in the hand. The second battery pack 31 is attached to the housing 2 steadfastly since it is connected to the housing 2 at both ends far spaced in the lengthwise direction of the housing 2—more precisely, at the first pack section 32 and the engagement member 51 of the second pack section 33. Thus, when the second pack section 33 is held in the hand, the second battery pack 31 will not move relative to the housing 2, or no force will concentrate at the interface between the battery receptacle 15 and the first pack section 32. This serves to increase the portability of the portable computer 1.

As indicated above, the lower half 38 of the second pack section 33 has the support wall 48 which overlaps the bottom 3b of the housing 2 as long as the second battery pack 31 is attached to the housing 2. Hence, not only the first pack portion 32 and the engagement member 51, but also the middle portion of the second pack section 33 extending between the portion 32 and the member 51 is placed in contact with the housing 2. The second battery pack 31 is therefore attached to the housing 2 more firmly than otherwise. That is, the second battery pack 32 can be attached steadfastly to the housing 2 though it is much heavier than the first battery pack 16.

Since the second pack section 33 is long, extending between the ends of the housing 2 while the second battery pack 31 is attached thereto, it can contain many nickel-cadmium batteries 34 to lengthen the time for which the computer 1 can be used in commercial power supply is not available. Being relatively long, the second pack section 33 provides a long grip, which enhances the portability of the computer 1.

Both the battery receptacle 15 in which to fit the first pack section 32 and the pen receptacle 12 into which to fit the projection 54 are indispensable components to the portable computer 1. The housing 2 needs to have no additional component to hold the second battery pack 31 at two ends. Thus the second battery pack 31 can be applied to the computer 1, without modifying the housing 2 of the computer 1.

Figure 6:
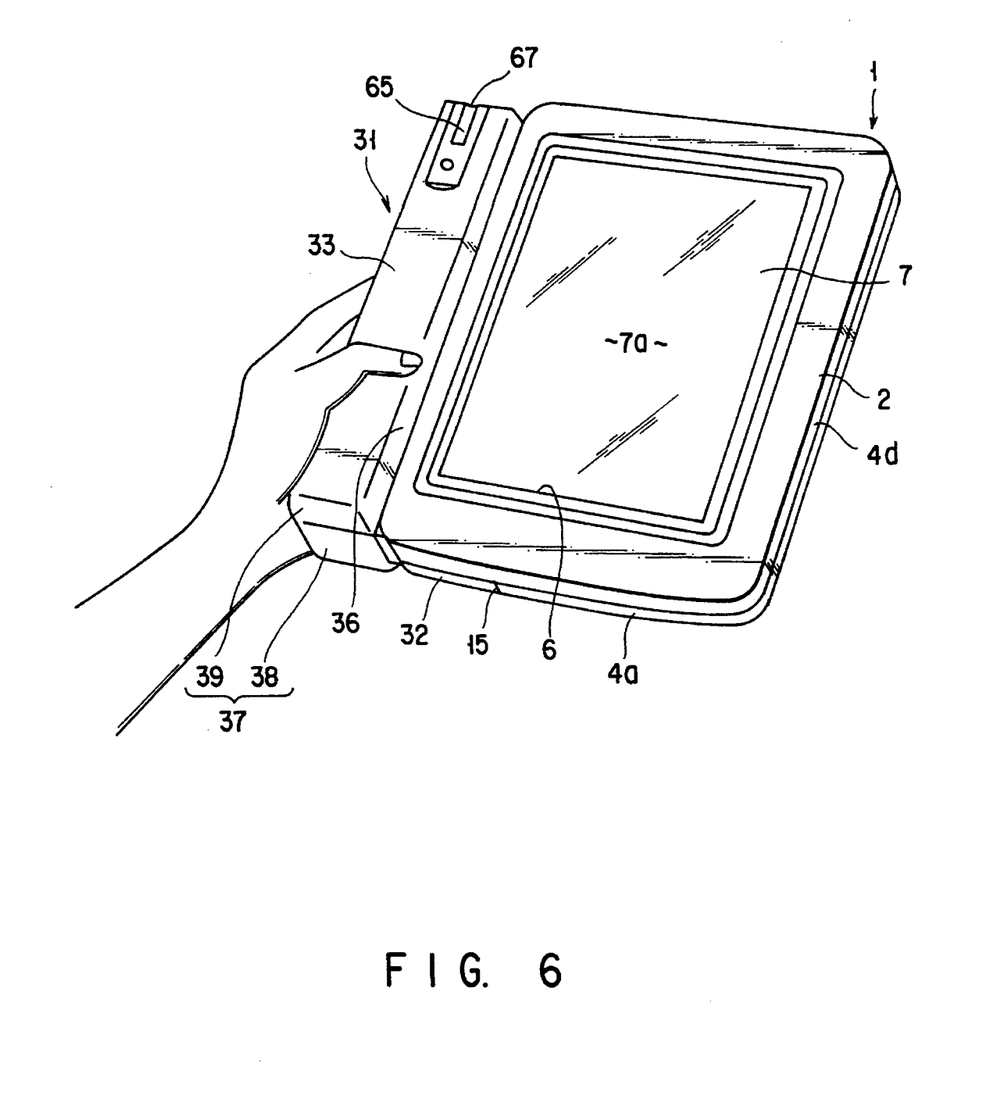
FIG. 6 is a perspective view of the portable computer, showing the second battery pack attached to it and the second package section thereof used as a grip and held in the hand.

In the structure described above, the recess 36 is formed between the upper half 39 of the case 37 and the third side 4c of the housing 2, and the recess 49 is formed in the lower surface 48a of the support wall 48, so long as the second battery pack 31 remains attached to the housing 2. Both recesses 36 and 49 can serve as finger rests. Therefore, as shown in FIG. 6, the user can hold the computer 1 in the left hand, by placing the thumb in the recess 36 and the fingers in the recess 49. The thumb or the fingers are not likely to slip, and the computer 1 can be held quite steadily.

If the user holds the computer 1 in the hand as shown in FIG. 6, he or she can tilt the data-input panel 7a at any angle desired in order to trace characters and symbols on the panel 7a with the stylus pen 8. This enhances the operability of the portable computer 1. As shown in FIG. 3, the panel 7a is spaced from the second pack section 33 by the top frame 3a of the housing 2. Therefore, when the computer 1 held in the left hand at the second battery pack 31 as shown in FIG. 6, the thumb cannot touch the panel 7a to leave fingerprint or dirt on the panel 7a or to scratch the panel 7a.

To attach the second battery pack 31 to the housing 2 it is necessary to pull the stylus pen 8 from the pen receptacle 12. Nevertheless, the pen 8 can be held in the pen-holding section 65 of the second pack section 33 while the pack 31 is being attached to the housing 2 and while the second battery pack 31 remains attached to the housing 2. Hence, the stylus pen 8 is not likely to go astray or to be broken.

As indicated above, the case 37 of the second battery pack 31 comprises the lower half 38 and the upper half 39, and the intermediate frame 45 is located between these halves 38 and 39. The lower half 38 and the frame 45 define, between them, the lower receptacle 46 which contains the nickel-cadmium batteries 35. The upper half 39 and the frame 45 defines, between them, the pen-holding section 65. The case 37 has been assembled, first by placing the nickel-cadmium batteries 35 in the second battery-containing portion 41 of the lower half 38, then by fitting the intermediate frame 45 in the opening of the lower half 38, and finally by mounting the upper half 39 on the lower half 39. Thus, the pen-holding section 65 is formed at the same time the batteries 35 are loaded into the lower receptacle 46. The case 37 can therefore be assembled with ease and high efficiently.

The present invention is not limited to the embodiment described above. Rather, various changes and modifications can be made within the scope and spirit of the invention.

For instance, the second pack section 33 may be replaced by an L-shaped pack section the shorter and longer parts of which extend along the second side 4b and third side 4c of the housing 1, respectively.

Moreover, the portable data-processing apparatus according to the present invention is not limited to a pen-input type portable computer. The present invention can be applied to a pen-input type word processor, as well.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A portable data-processing system comprising:
    a box-shaped housing having a side and a receptacle opening at the side;
    a first pack-shaped component removably fitted in said receptacle; and
    a second pack-shaped component capable of being removably fitted in said receptacle in place of said first pack-shaped component,
    wherein said second pack-shaped component has a first part which is to be removably fitted in said receptacle and a second part which is a hollow cylindrical member and which is to extend outside said housing and along the side of said housing.

2. The system according to claim 1, wherein said first pack-shaped component is a first battery pack functioning as a power supply for driving components contained in said housing, and said second pack-shaped component is a second battery pack having a greater power-storage capacity than said first battery pack.

3. The system according to claim 2, wherein said second battery pack has a plurality of batteries and a case containing the batteries, said case comprising a lower section, an upper section coupled to the lower section and an intermediate frame interposed between the lower section and the upper section, said lower section and said intermediate frame defining a battery receptacle which contains said batteries.

4. The system according to claim 1, wherein said housing has a flat upper surface, and an input/display section is mounted on the upper surface, for inputting data and displaying data.

5. The apparatus according to claim 1, wherein said housing is shaped like a rectangular box having a long axis and a short axis intersecting at right angles with the long axis, the second part of said second pack-shaped component extends parallel to the long axis of said housing and along a long side of said housing.

6. The system according to claim 5, wherein said second part and the long side of said housing define a recess which opens upwards and which is located at an interface between said housing and said second part.

7. A portable data-processing system comprising:
    a box-shaped housing having a side, a first receptacle opening at an end of the side and a second receptacle located at the opposite end of the side;
    a first pack-shaped component removably fitted in said first receptacle; and
    a second pack-shaped component capable of being removably fitted in said first receptacle in place of said first pack-shaped component,
    wherein said second pack-shaped component has a first part which is to be removably fitted in said first receptacle and a second part which is a hollow cylindrical member connected to the first part and which is to be located outside said housing, said second part having an engagement member which is capable of being removably fitted in the second receptacle of said housing.

8. The system according to claim 7, wherein said engagement member is attached to said second part and capable of moving between a first position where said engagement member fits into said second receptacle and a second position where said engagement member is released from said second receptacle.

9. The system according to claim 8, wherein said engagement member has a slider slidably supported by said second part, and said second part has holder means for holding the slider at said first position and said second position.

10. The system according to claim 8, wherein said second part has a lock member for locking said engagement member at said first position.

11. The system according to claim 7, wherein said housing is shaped like a rectangular box having a long axis and a short axis intersecting at right angles with the long axis, and the second part of said second pack-shaped component extends parallel to the long axis of said housing and along a long side of said housing.

12. The system according to claim 11, wherein said first receptacle and said second receptacle are spaced apart along the long axis of said housing.

13. The system according to claim 7, wherein said housing has a flat upper surface, and an input/display section is mounted on the upper surface, for inputting data and displaying data.

14. The system according to claim 13, further comprising a pen for inputting data to said input/display section, said pen is removably held in said second receptacle.

15. The system according to claim 14, wherein the second part of said second pack-shaped component has a pen-holding section for holding said pen.

16. The system according to claim 7, wherein said first pack-shaped component is a first battery pack functioning as a power supply for driving components contained in said housing, and said second pack-shaped component is a second battery pack having a greater power-storage capacity than said first battery pack.

17. The system according to claim 16, wherein said second battery pack has a plurality of batteries and a case containing the batteries, said case comprising a lower section, an upper section coupled to the lower section and an intermediate frame interposed between the lower section and the upper section, said lower section and said intermediate frame defining a battery receptacle which contains said batteries and said upper section and said intermediate frame defining said pen-holding section.

18. The system according to claim 16, wherein said housing has a bottom, and the second part of said second pack-shaped component has a support wall which overlaps the bottom of said housing.

19. A portable data-processing system comprising:

a box-shaped housing having an upper surface and a bottom surface which oppose each other and four side surfaces continuous to the upper surface and the bottom surface, said housing having a battery receptacle opening in a corner defined by said bottom surface and two opposing ones of said four side surfaces, and having a pen receptacle located at an end opposite to said battery receptacle;

a data input section mounted on the upper surface of said housing, for inputting data;

a pen removably held in said pen receptacle, for inputting data into said data input section;

a first battery pack removably fitted in said battery receptacle and functioning as a power supply for driving components contained in said housing; and a second battery pack capable of being removably fitted in said first receptacle in place of said first battery pack and having a greater power-storage capacity than said first battery pack, wherein said second battery pack has a first part which is to be removably fitted in said battery receptacle and a second part which is a hollow cylindrical member connected to the first part and which is to be located outside said housing, said second part having an engagement member which faces away from said first part and which is capable of being removably fitted in said pen receptacle.

20. The system according to claim 19, wherein the second part of said second battery pack has a pen-holding section for holding said pen.

21. The system according to claim 19, wherein said engagement member is attached to said second part and capable of moving between a first position where said engagement member fits into said pen receptacle and a second position engagement member is released from said pen receptacle.

* * * * *